United States Patent
Oh

(10) Patent No.: US 12,134,321 B2
(45) Date of Patent: Nov. 5, 2024

(54) METHOD OF VIRTUALIZING CHARACTERISTICS OF INTERNAL COMBUSTION ENGINE VEHICLE IN ELECTRIC VEHICLE

(71) Applicants: HYUNDAI MOTOR COMPANY, Seoul (KR); KIA CORPORATION, Seoul (KR)

(72) Inventor: Ji Won Oh, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 204 days.

(21) Appl. No.: 18/071,804

(22) Filed: Nov. 30, 2022

(65) Prior Publication Data

US 2023/0391205 A1 Dec. 7, 2023

(30) Foreign Application Priority Data

Jun. 7, 2022 (KR) .......................... 10-2022-0068661

(51) Int. Cl.
*B60L 15/00* (2006.01)
*B60L 15/20* (2006.01)

(52) U.S. Cl.
CPC .................................... *B60L 15/20* (2013.01)

(58) Field of Classification Search
CPC ........ B60L 15/20; G10K 15/02; G10K 15/04; G10K 2210/1282; G10K 2210/51; B60Y 2200/91
See application file for complete search history.

(56) References Cited

U.S. PATENT DOCUMENTS

| | | | |
|---|---|---|---|
| 10,059,260 B2* | 8/2018 | Kim | G10K 15/02 |
| 10,766,479 B2* | 9/2020 | Galang | B60W 10/06 |
| 10,807,600 B2* | 10/2020 | Jordan, III | B60K 35/00 |
| 2010/0134058 A1* | 6/2010 | Nagashima | H02P 21/06 |
| | | | 180/65.285 |
| 2020/0184946 A1* | 6/2020 | Jung | B60Q 5/008 |

(Continued)

OTHER PUBLICATIONS

J. Margielewicz, et al., "Modelling of the gear backlash," Nonlinear Dyn, 2019, pp. 355-368.

(Continued)

*Primary Examiner* — Phutthiwat Wongwian
*Assistant Examiner* — Sherman D Manley
(74) *Attorney, Agent, or Firm* — Morgan, Lewis & Bockius LLP

(57) ABSTRACT

A method of virtualizing characteristics of an internal combustion engine vehicle in an electric vehicle, includes obtaining, by a controller, real-time vehicle driving information, determining, by the controller, tooth surface pressures of gears in the powertrain between a motor for driving a vehicle and driving wheels based on the obtained real-time vehicle driving information, generating, by the controller, a virtual effect signal for generating a virtual effect that simulates powertrain characteristics of an internal combustion engine vehicle based on the determined tooth surface pressures of the gears in the powertrain, and generating, by the controller, a virtual effect that simulates powertrain characteristics of an internal combustion engine vehicle by controlling an operation of a virtual effect generation device that generates a virtual effect according to the generated virtual effect signal.

20 Claims, 8 Drawing Sheets

(56) References Cited

U.S. PATENT DOCUMENTS

| | | | |
|---|---|---|---|
| 2021/0309113 A1* | 10/2021 | Mazzini | B60L 7/14 |
| 2022/0089035 A1* | 3/2022 | Oh | B60L 50/60 |
| 2023/0016272 A1* | 1/2023 | Kim | B60W 50/14 |
| 2023/0391205 A1* | 12/2023 | Oh | B60L 15/20 |
| 2023/0391339 A1* | 12/2023 | Oh | B60Q 9/00 |
| 2023/0395059 A1* | 12/2023 | Oh | B60L 15/20 |
| 2024/0181893 A1* | 6/2024 | Oh | B60L 15/20 |

OTHER PUBLICATIONS

G. P. Prajapat, et al., "Modeling and impact of gear train backlash on performance of DFIG wind turbine system," Electric Power Systems Research, vol. 163, 2018, ,pp. 356-364.

\* cited by examiner

|  | torque | tooth surface pressure |
|---|---|---|
| A direction | forward torque | forward pressure, positive pressure |
| B direction | reverse torque | reverse pressure, negative pressure |

# METHOD OF VIRTUALIZING CHARACTERISTICS OF INTERNAL COMBUSTION ENGINE VEHICLE IN ELECTRIC VEHICLE

CROSS REFERENCE TO RELATED APPLICATION

The present application claims priority to Korean Patent Application No. 10-2022-0068661, filed Jun. 7, 2022, the entire contents of which is incorporated herein for all purposes by this reference.

BACKGROUND OF THE PRESENT DISCLOSURE

Field of the Present Disclosure

The present disclosure relates to a method of virtualizing characteristics of an internal combustion engine (ICE) vehicle in an electric vehicle (EV), and more particularly, to a method of virtualizing an operation feeling of a powertrain apparatus including an internal combustion engine, a transmission, and a clutch, as well as driving feeling of an ICE vehicle, in an EV.

DESCRIPTION OF RELATED ART

As is known, an electric vehicle (EV) is a vehicle that runs on a motor as a driving device. A battery electric vehicle (BEV) is a pure electric vehicle that runs using only a motor.

A powertrain apparatus of a battery electric vehicle includes a battery that supplies power to drive a motor, an inverter electrically connected to the battery, a motor which is a driving device for making a vehicle move and is connected to the battery for charging and discharging via the inverter, and a reducer that reduces rotation force of the motor and transmits the rotation force to driving wheels.

Unlike a conventional internal combustion engine (ICE) vehicle, a typical electric vehicle does not have a multi-speed transmission, and instead a reducer with a fixed gear ratio is disposed between a motor and driving wheels.

This is because, unlike an internal combustion engine, which has a wide distribution range of energy efficiency according to the operating point and can provide high torque only in the high-speed region, in the case of a motor, the difference in efficiency according to the operating point is relatively small, and it is possible to realize low speed and high torque only with the characteristics of a single motor unit.

Furthermore, vehicles provided with a conventional internal combustion engine powertrain apparatus require a starting mechanism such as a torque converter or clutch due to the characteristics of an internal combustion engine, wherein low-speed operation is impossible, while in a powertrain apparatus of an electric vehicle, the starting mechanism may be removed as the motor has the characteristics of being easy to run at low speeds.

Furthermore, the powertrain apparatus of an electric vehicle generates power by running a motor with electrical energy from a battery, rather than generating power by combusting fuel as in a conventional internal combustion engine vehicle.

Accordingly, compared to the torque of an internal combustion engine generated by aerodynamic and thermodynamic reactions, the torque of an electric vehicle is generally characterized by being more sophisticated, smoother, and more responsive. Due to these mechanical differences, unlike internal combustion engine vehicles, electric vehicles may provide smooth operation without interruption of drivability due to shifting gears, etc.

Moreover, in vehicles provided with conventional internal combustion engine powertrain apparatuses, the main source of vibrations is the internal combustion engine (engine). The vibrations generated by the periodic explosive force of the internal combustion engine in the ignition-on state is transmitted to a vehicle body and passengers through the powertrain apparatus or mount.

These vibrations are often considered negative factors to be damped. In the present aspect, because there is no vibration source in the electric vehicle in which the motor replaces the engine, it is advantageous compared to the internal combustion engine vehicle in terms of improving ride comfort.

However, for drivers looking for a fun driving experience, the absence of vibrations from the engine may make them feel bored. In electric vehicles, which aim for high performance, there are times when it is necessary to provide not only a smooth feeling but also a rough and trembling sensation.

Yet, electric vehicles have limitations in providing these emotional elements to the driver. Thus, there is a demand for a method of generating virtual effects that simulate vibrations and sounds produced by the powertrain apparatus of an internal combustion engine vehicle in an electric vehicle.

It is necessary to provide a function for virtualizing the driving characteristics of an internal combustion engine vehicle, so that the driver may experience the desired sensation in his or her vehicle without having to switch to an internal combustion engine vehicle when the driver wants to feel the driving sensibility, fun, excitement, and direct shift feeling provided by the engine, transmission, clutch, etc.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of virtualizing characteristics of a powertrain apparatus of an internal combustion engine vehicle in an electric vehicle, which enables a driver to experience the driving sensibility, fun, excitement, and direct shift feeling provided by an internal combustion engine (engine), transmission, clutch, etc.

Objectives of the present disclosure are not limited to the objective mentioned above, and other objectives not mentioned will be clearly understood by those skilled in the art to which the present disclosure pertains from the description below (hereinafter referred to as "person of ordinary skill").

In various aspects of the present disclosure, according to an exemplary embodiment of the present disclosure, there is provided a method of virtualizing characteristics of an internal combustion engine vehicle in an electric vehicle, the method including: obtaining, by a controller, real-time vehicle driving information; determining, by the controller, tooth surface pressures of gears in a powertrain apparatus between a motor configured for driving a vehicle and driving wheels based on the obtained real-time vehicle driving information; generating, by the controller, a virtual effect signal for generating a virtual effect that simulates powertrain characteristics of an internal combustion engine vehicle based on the determined tooth surface pressures of the gears in the powertrain apparatus; and generating, by the controller, a virtual effect that simulates powertrain characteristics of an internal combustion engine vehicle by controlling an operation of a virtual effect generation device that generates a virtual effect according to the generated virtual effect signal.

In various aspects of the present disclosure, according to an exemplary embodiment of the present disclosure, there is provided an apparatus of virtualizing characteristics of an internal combustion engine vehicle in an electric vehicle, including: a driving information detection unit provided in the electric vehicle and configured for detecting vehicle driving information; a controller connected to the driving information detection unit and configured to: determining a current input torque applied to a powertrain apparatus from a motor that makes a vehicle move; determining an output torque which is a transmission torque based on a powertrain model from the determined current input torque using the powertrain model set to include a gear model; determining tooth surface pressures of gears in the powertrain apparatus between the motor and driving wheels of the electric vehicle from the determined output torque; generating a virtual effect signal for generating a virtual effect that simulates powertrain characteristics of the internal combustion engine vehicle based on the determined tooth surface pressures of the gears in the powertrain apparatus; and generating a virtual effect that simulates powertrain characteristics of the internal combustion engine vehicle by controlling an operation of a virtual effect generation device that generates a virtual effect according to the generated virtual effect signal; and a non-transitory storage medium configured for storing an algorithm for an operation of the controller.

As described above, according to a method of virtualizing characteristics of an internal combustion engine vehicle in an electric vehicle, in an electric vehicle without an internal combustion engine (engine), transmission, clutch, etc., it is possible to virtualize and provide powertrain characteristics of an internal combustion engine vehicle through vibrations and sounds, and to provide a driver with feelings of operation and driving as if the actual internal combustion engine, transmission, and clutch were operating.

Furthermore, the driver can experience the driving sensibility, fun, excitement, and direct shift feeling provided by the powertrain apparatus of an internal combustion engine vehicle in his or her vehicle without having to switch to an internal combustion engine vehicle.

By generating virtual vibrations and virtual sounds that are linked to tooth surface pressure of a powertrain gear, the realism of the virtual effects may be maximized, and the highly realistic virtual effects can, in turn, greatly improve the vehicle's marketability.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
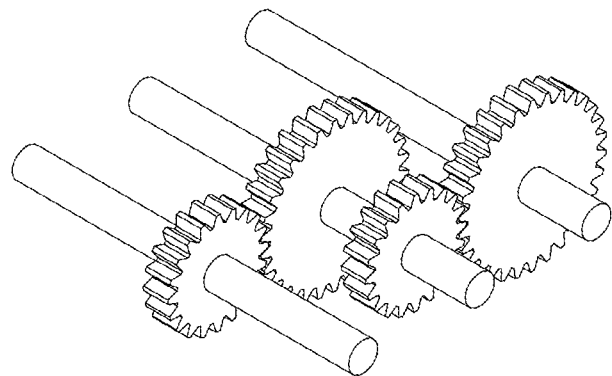
FIG. 1 and FIG. 2 are views schematically showing a gear element of a powertrain apparatus in a vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the accompanying drawings. The specific structural or functional descriptions presented in the exemplary embodiments of the present disclosure are only exemplified for describing the exemplary embodiments according to the concept of the present disclosure, and the exemplary embodiments according to the concept of the present disclosure may be implemented in various forms. Furthermore, it should not be construed that the present disclosure is limited by the exemplary embodiments described herein, but should be understood to include all modifications, equivalents and substitutes included in the spirit and scope of the present disclosure.

Meanwhile, in the present disclosure, terms such as first and/or second may be used to describe various components, but the components are not limited by the terms. The terms are used only for distinguishing one component from other components, for example, within the scope not departing from the scope of rights according to the concept of the present disclosure, the first component may be referred to as the second component, and similarly, the second component may also be referred to as the first component.

When a component is referred to as being "connected" to another component, it should be understood that the component may be directly connected to the other component, but other components may exist in between. On the other hand, when it is said that a component is "directly connected" to another component, it should be understood that no other component is present in the middle. Other expressions for describing the relationship between components, that is, expressions such as "between" and "immediately between" or "adjacent to" and "directly adjacent to" should be interpreted similarly.

Like reference numerals refer to like components throughout. The terminology used herein is for describing the embodiments, and is not intended to limit the present disclosure. In the present specification, the singular also includes the plural unless stated in the phrase. As used herein, "comprises" and/or "comprising" do not exclude the presence or addition of one or more other components, steps, acts and/or elements by a recited component, step, operation and/or element.

The present disclosure is directed to providing a method of virtualizing characteristics of a powertrain apparatus of an internal combustion engine vehicle in an electric vehicle, which enables a driver to experience the driving sensibility, fun, excitement, and direct shift feeling provided by an internal combustion engine, transmission, clutch, etc.

Furthermore, the present disclosure is directed to providing a method of realizing virtual drivability so that a driver may experience the desired driving feel and sensation of an internal combustion engine vehicle in his or her vehicle without having to switch to an internal combustion engine vehicle.

To the present end, it is necessary to generate virtual effects that are linked to the powertrain characteristics of an internal combustion engine vehicle in an electric vehicle, which is the vehicle to be applied, to provide a more realistic driving feel and sensation to the driver. However, conventionally, there is a limitation in implementing virtual effects close to the powertrain characteristics of an actual internal combustion engine vehicle, only generating virtual effects that are linked only to an accelerator pedal input value (APS value), which is the driver's driving input information, or the powertrain speed or vehicle speed.

Moreover, although it is known to generate and provide virtual sounds in an electric vehicle, there is a problem in that the virtual sounds are different from the sounds generated in the actual internal combustion engine (engine) vehicle, so that the driver may feel a sense of difference.

Accordingly, the present disclosure focuses on facilitating the driver to feel more realistic sensation and driving feel of the internal combustion engine-based powertrain apparatus by generating virtual vibrations and sounds to virtualize and provide the powertrain characteristics that could be felt in an internal combustion engine vehicle in an electric vehicle, and by generating virtual vibrations and sounds that are linked to the vehicle's powertrain characteristics and actual driving situations.

In the present disclosure, the main technical feature is to generate and provide virtual vibration and sound effects that are linked to tooth surface pressures of the powertrain gears so that the driver may experience dynamic sensation without any sense of difference compared to an actual internal combustion engine vehicle.

In the present disclosure, an electric vehicle is a vehicle powered by a motor as a driving device configured for moving the vehicle, and is an electric vehicle in a broad sense including, for example, a battery electric vehicle (BEV), a hybrid electric vehicle (HEV), and a fuel cell electric vehicle (FCEV), which are pure electric vehicles.

In the case of a hybrid vehicle, the virtual effect creation and implementation process according to an exemplary embodiment of the present disclosure may be performed in an EV mode driven only by a motor. As described above, the method of emulating characteristics of an internal combustion engine vehicle according to an exemplary embodiment of the present disclosure may be applied to an electric vehicle powered by a motor.

In the following description, the terms internal combustion engine and engine have a same meaning, and the motor means a driving motor configured for moving the vehicle.

Vibration and sound generated in a vehicle provided with an existing internal combustion engine (engine) may be mainly classified as follows.
1. Fluid sound by engine intake
2. Radiated vibration and sound due to explosion stroke and pressure change in engine combustion chamber
3. Vibration transmitted from engine vibration to the vehicle body through the powertrain apparatus, and radiated sound
4. Vibration and flow resonance acoustics by the engine exhaust system Among them, the most important for the driver or passengers in the vehicle is the number 3, vibration transmitted from engine vibration to the vehicle body through the powertrain apparatus, and radiated sound.

Therefore, the main purpose of generating virtual effects in electric vehicles, that is, generating virtual vibrations and sounds that mimic the vibrations and sounds generated by the powertrain apparatus in an internal combustion engine vehicle, is to provide the driver of an electric vehicle with the same sensation as in an internal combustion engine vehicle. Thus, regarding virtual vibration and sound creation in an electric vehicle, the vibration and sound effects corresponding to the number 3 above may be considered most importantly among the vibrations and sounds of an internal combustion engine vehicle.

Additionally, in an electric vehicle, the degree to which vibration is radiated to the vehicle body and cabin through the powertrain apparatus is proportional to the tooth surface pressure of the powertrain gear. At the instant time, powertrain gears refer to gears in which torque is transmitted between the motor and the driving wheels, and this may mean gears in a known powertrain apparatus in which rotation force is transmitted between the motor and the driving wheels in an electric vehicle. A typical powertrain gear in an electric vehicle is gears of a reducer.

According to an exemplary embodiment of the present disclosure, by generating virtual vibrations and virtual sounds that are linked to the tooth surface pressure of the powertrain gear as virtual effects simulating the powertrain characteristics of an internal combustion engine vehicle in an electric vehicle, the realism of the virtual effects may be maximized, and the highly realistic virtual effects may, in turn, greatly improve the vehicle's marketability.

Figure 2:
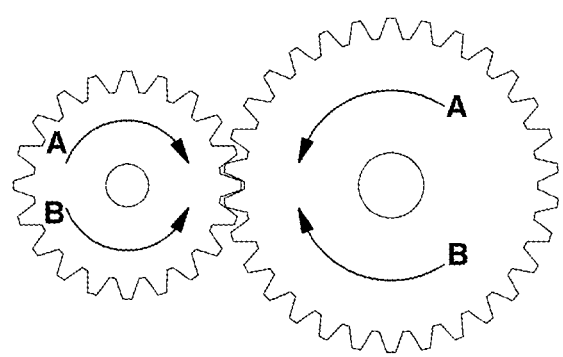

FIG. 1 and FIG. 2 schematically show gears in a powertrain apparatus of a vehicle. In an electric vehicle, there is a plurality of gears that perform torque (and force) transmission through mutual meshing and simultaneous rotation in a powertrain apparatus between a motor, which is a driving device, and driving wheels connected to the motor configured for power transmission.

In the powertrain apparatus of an internal combustion engine vehicle, as the gear tooth surface pressure increases, the vibration transmission characteristics between various moving parts of the powertrain apparatus become closer to a rigid body, and thus the transmission rate of vibration generated in the internal combustion engine increases.

On the other hand, the smaller the tooth surface pressure of the gear in the powertrain apparatus, the lower the stress between adjacent moving parts, making it difficult to transmit vibration, which leads to vibration energy attenuation by a surrounding lubrication part, reducing the vibration transmission rate. That is, as the magnitude of the tooth surface pressure (absolute value of pressure) of the powertrain gear increases, the magnitude of the vibration increases and the magnitude of the vibration decreases as the magnitude of the tooth surface pressure of the powertrain gear decreases (refer to FIGS. 9 and 11 to be described later).

In consideration of this, in the present disclosure, as the size of the tooth surface pressure (absolute value of pressure) of the powertrain gear increases, the size of the virtual effect (the amplitude of vibration and the volume of the sound) becomes larger and the size of the virtual effect becomes smaller as the size of the tooth surface pressure of the powertrain gear decreases.

The main technical features of the present disclosure are, for the powertrain characteristics as described above to be expressed in an electric vehicle, virtual vibration and sound are set as described below as a virtual effect that simulates the characteristics of an internal combustion engine vehicle, and the vibrations and sounds reflecting the powertrain characteristics are generated and implemented to be provided to a driver.

For reference, in the present disclosure, the tooth surface pressure means the pressure applied by compression between the tooth surfaces of the gears engaged, and due to the characteristics of the gear, for each tooth, there are two surfaces (the surfaces of both sides of each tooth) on which the tooth pressure may act. According to the direction of the torque transmitted in the state in which the two gears are meshed, the pressure is applied to the selected one of the two surfaces of each tooth for each gear.

For example, when forward torque is transmitted through two gears, the tooth surface pressure (forward pressure) by compression acts on one of the two surfaces of each tooth for each gear, and conversely, when reverse torque is transmitted, the tooth surface pressure (reverse pressure) by compression acts on the other one of the two surfaces of each tooth for each gear.

Here, the forward torque applied from the motor, which is a driving device (reference numeral 41 in FIG. 3 to be described later), may be defined as a torque in the direction of accelerating a vehicle, while the reverse torque may be defined as a torque in the direction of decelerating the vehicle.

Furthermore, although pressure is a scalar value and not a vector value, so it has no directionality, in the present specification, the tooth surface pressure acting by the application of the forward torque may be defined as the forward pressure, and the tooth surface pressure acting by the application of the reverse torque may be defined as the reverse pressure for convenience of explanation, and in the instant case, the pressure value may have directionality.

In the description of the present disclosure, a negative (−) pressure (see FIGS. 9 and 11) on the tooth surface means a reverse pressure, and a positive (+) pressure on the tooth surface means a forward pressure. Additionally, the forward pressure is the tooth pressure acting on one of the two surfaces of each tooth of the two gears, and the reverse pressure is the tooth pressure acting on the other of the two surfaces of each tooth of the two gears.

Accordingly, in the tooth surface pressure acting on one tooth in each gear in the meshed state, the division of negative pressure and positive pressure, and the division of forward pressure and reverse pressure, depend on the direction of the torque (see FIG. 2).

Figure 3:
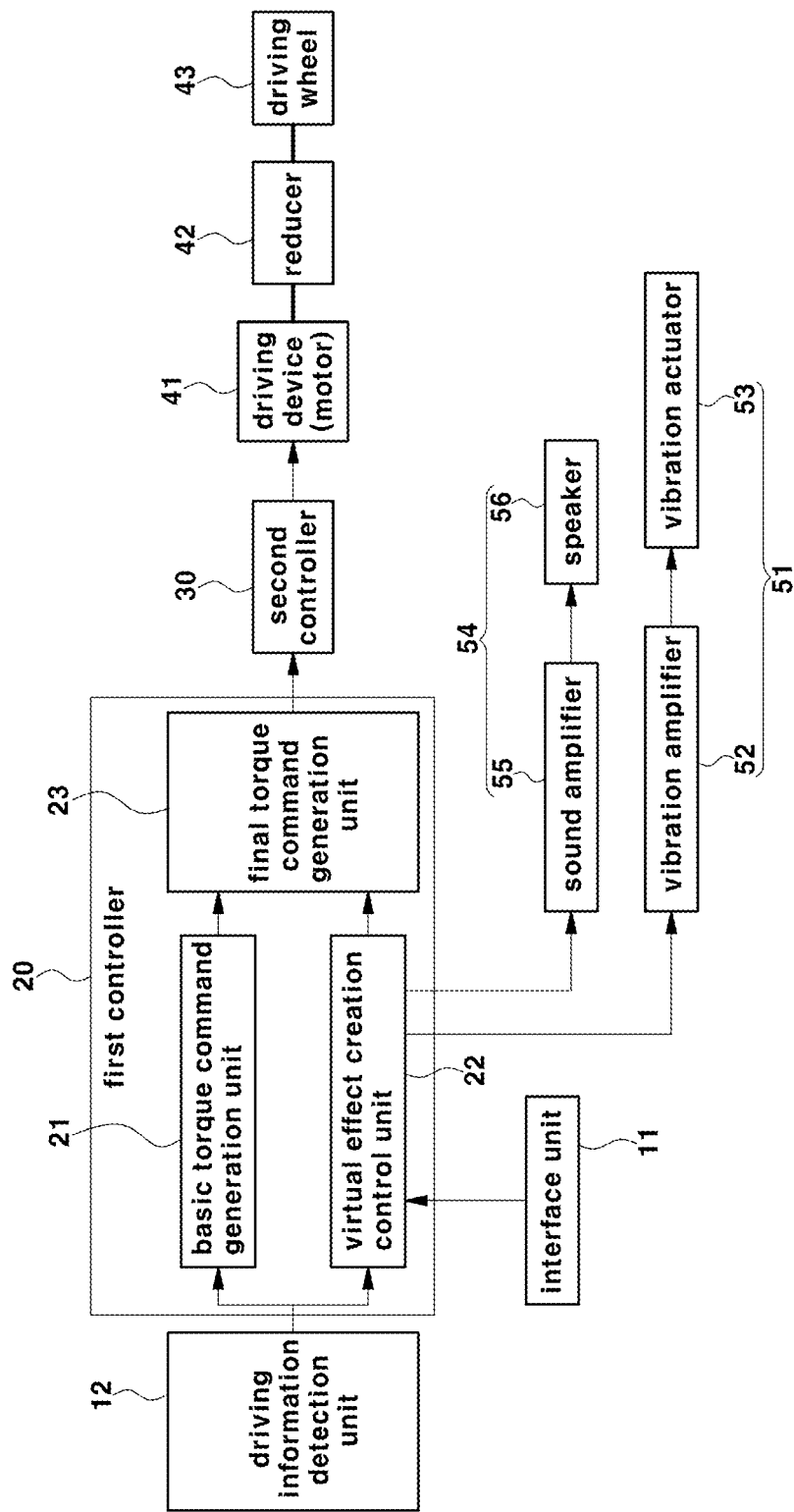
FIG. 3 is a block diagram showing the configuration of an apparatus of virtualizing characteristics of an internal combustion engine vehicle according to an exemplary embodiment of the present disclosure.
Figure 4:
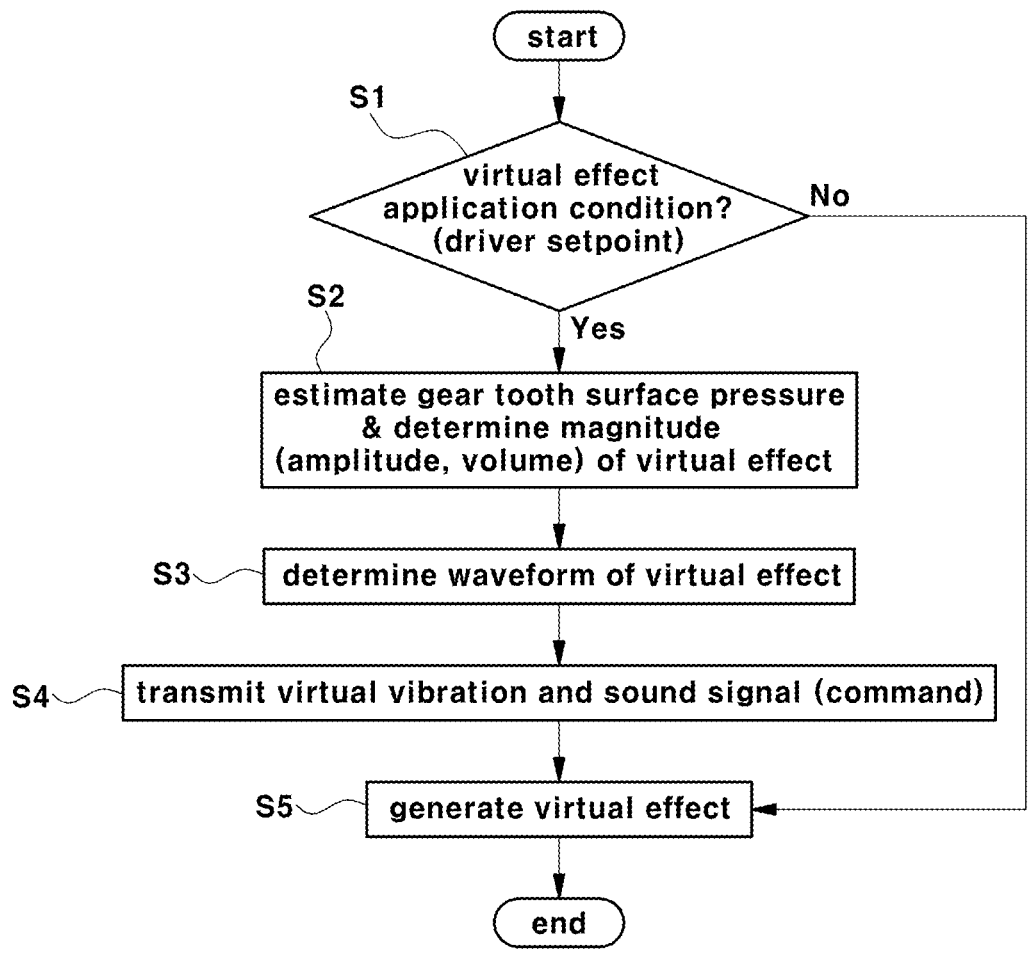
FIG. 4 is a flowchart showing the process for virtualizing characteristics of an internal combustion engine vehicle according to an exemplary embodiment of the present disclosure.

FIG. 3 is a block diagram showing the configuration of an apparatus of virtualizing characteristics of an internal combustion engine vehicle according to an exemplary embodiment of the present disclosure; and FIG. 4 is a flowchart showing the process for virtualizing characteristics of an internal combustion engine vehicle according to an exemplary embodiment of the present disclosure.

The method of virtualizing characteristics of an internal combustion engine vehicle in an electric vehicle according to an exemplary embodiment of the present disclosure is a method of virtualizing the operation feeling and driving feeling of a powertrain apparatus of an internal combustion engine vehicle in an electric vehicle.

Furthermore, in the present disclosure, virtualizing characteristics of an internal combustion engine vehicle means that, when the powertrain apparatus of the applicable vehicle which is an electric vehicle is operated, vibration and sound that are as similar as possible to those generated in the internal combustion engine vehicle are actually generated in the electric vehicle, although vibration and sound that do not occur in reality.

In the present disclosure, virtualizing the characteristics of the internal combustion engine vehicle means actually generating and providing vibration and sound in the electric vehicle, which simulate the actual vibration and sound generated by the powertrain apparatus in the internal combustion engine vehicle according to the powertrain apparatus characteristics, the operation condition of the powertrain apparatus, and the vehicle driving condition.

In the present disclosure, vibration and sound that simulate the actual vibration and sound are defined as a "virtual vibration" and a "virtual sound", and in the following description, a "virtual effect" includes at least one of the virtual vibration and the virtual sound.

As shown in FIG. 3, an apparatus of virtualizing the characteristics of an internal combustion engine vehicle according to an exemplary embodiment of the present disclosure includes: a driving information detection unit 12 which is provided in a vehicle and detects vehicle driving information; a first controller 20 that generates and outputs a torque command based on the vehicle driving information detected by the driving information detection unit 12; a second controller 30 that is configured to control the operation of a driving device 41 according to the torque command output from the first controller 20.

In the following description, the control subject includes the first controller 20 and the second controller 30. However, the control process for virtualizing the characteristics of the internal combustion engine vehicle and realizing the virtual effect according to an exemplary embodiment of the present disclosure may be performed by one integrated control element instead of a plurality of controllers.

A plurality of controllers and one integrated control element may all be collectively referred to as a controller, and the control process of the present disclosure may be performed by the controller. In the following description, the term "controller" may refer to the first controller 20 and the second controller 30 collectively.

The driving information detection unit 12 is a component that determines a driver demand torque in the vehicle and detects vehicle driving information required to perform a virtual effect implementation function, and the vehicle driving information may include driver's driving input information and vehicle state information. In the following description, a "virtual effect implementation function" refers to a function for generating and implementing a virtual effect (virtual vibration and virtual sound simulating the vibration and sound of an internal combustion engine vehicle).

In an exemplary embodiment of the present disclosure, the driving information detection unit 12 includes: an accelerator pedal detection unit that detects accelerator pedal input information according to the driver's operation of the accelerator pedal; a brake pedal detection unit that detects brake pedal input information according to the driver's operation of the brake pedal; and a vehicle speed detection unit that detects vehicle speed.

Here, the accelerator pedal detection unit may be a conventional accelerator position sensor (APS) which is provided on the accelerator pedal and outputs an electrical signal according to the driver's operation state of the accelerator pedal. The brake pedal detection unit may be a conventional brake pedal sensor (BPS) which is provided on the brake pedal and outputs an electrical signal according to the driver's operation state of the brake pedal.

The vehicle speed detection unit may include a wheel speed sensor. Because obtaining vehicle speed information from the signal of the wheel speed sensor is a well-known technique in the art, so a detailed description thereof will be omitted.

The driver's driving input information among the vehicle driving information detected by the driving information detection unit 12 includes: an accelerator pedal input value (APS value) detected by the accelerator pedal detection unit as a driving input value according to the driver's operation of the accelerator pedal; and a brake pedal input value (BPS value) detected by the brake pedal detecting unit as a driving input value according to the driver's operation of the brake pedal. The vehicle speed detected by the vehicle speed detecting unit becomes vehicle state information among the vehicle driving information.

The driving information detection unit 12 may further include a speed detection unit that detects rotation speed of a vehicle powertrain apparatus, and the rotation speed of the vehicle powertrain apparatus (powertrain speed) may include rotation speed of a motor (motor speed) and rotation speed of a driving wheel 43 (driving wheel speed). The rotation speed of the vehicle powertrain apparatus (powertrain speed) may also include rotation speed of a driveshaft (driveshaft speed).

The speed detection unit may include a resolver provided in the motor and a wheel speed sensor provided in the driving wheel 43, and may also include a sensor configured for detecting the driveshaft speed. Additionally, the vehicle driving information further includes a powertrain speed, and the powertrain speed becomes vehicle state information among vehicle driving information.

Meanwhile, among the configurations of the apparatus shown in FIG. 3, the first controller 20 determines, generates, and outputs a torque command for controlling the operation of the driving device 41 based on real-time vehicle driving information. Here, the driving device 41 is a motor that drives the vehicle.

The first controller 20 includes: a basic torque command generation unit 21 that determines a driver demand torque from the real-time vehicle driving information obtained through the driving information detection unit 12 and generates a basic torque command for generating the determined driver demand torque.

Furthermore, the first controller 20 may further include a virtual effect creation control unit 22 that determines tooth surface pressure of a powertrain gear based on real-time output torque information of a powertrain apparatus and generates a virtual effect command (virtual effect signal) for generating and implementing a virtual effect based on the determined tooth surface pressure of the powertrain gear.

In the present disclosure, the real-time output torque of the powertrain apparatus may be determined by the powertrain model from the real-time input torque of the powertrain apparatus, and a motor torque command may be used as the input torque of the powertrain apparatus. At the instant time, because the motor torque command is determined from real-time driving information, it can be the that the gear tooth surface pressure of the powertrain apparatus is ultimately determined from the real-time vehicle driving information.

Moreover, the first controller 20 may further include a final torque command generation unit 23 that generates and outputs a final torque command using the basic torque command output from the basic torque command generation unit 21 and the virtual effect command output from the virtual effect creation control unit 22.

The final torque command is transmitted to the second controller 30, and the second controller 30 is configured to control the operation of the driving device 41 for driving the vehicle according to the final torque command. Here, the driving device 41 is a motor that drives the vehicle.

As shown in FIG. 3, the torque and rotation force output by the motor, which is the driving device 41, is decelerated by the reducer 42 and then transmitted to the driving wheel 43, and when the operation of the motor is controlled by the second controller 30 according to the final torque command of the first controller 20, a virtual powertrain characteristics of an internal combustion engine may be realized.

At the present time, the final torque command generated and output by the first controller 20 is a motor torque command configured for realizing virtual internal combustion engine powertrain apparatus characteristics, and when the operation of the motor, which is the driving device 41 of the vehicle, is controlled according to the final torque command, the output of the motor torque which may induce vehicle vibration and vehicle behavior corresponding to the tooth surface pressure of the powertrain gear during vehicle driving may be made.

In the present disclosure, the first controller 20 may be a vehicle control unit (VCU) that generates a motor torque command based on vehicle driving information in a typical electric vehicle, and the second controller 30 may be a motor control unit (MCU) that is configured to control the operation of the motor according to the motor torque command.

In the present disclosure, the virtual effect creation control unit 22 is a novel component that determines, generates, and outputs a virtual effect signal (command) for generating and implementing virtual vibration and virtual sound, separately from the basic torque command generation unit 21 and the basic torque command generated by the basic torque command generation unit 21, and may be added as portion of the vehicle control unit (VCU) or provided as a control element separate from the vehicle controller.

Here, the virtual effect signal may be a signal of a waveform including the magnitude (amplitude and volume) of the virtual effect corresponding to the tooth surface pressure of the powertrain gear, like the virtual effect signal for the operation of a vibration device 51 or a sound device 54, as will be described later.

In the final torque command generation unit 23, the basic torque command input from the basic torque command generation unit 21 is corrected by the virtual effect command input from the virtual effect creation control unit 22, and at the instant time, a correction may be made by adding the virtual effect command to the basic torque command transmitted from the basic torque command generation unit 21, and the corrected torque command becomes the final torque command for motor control.

In the present disclosure, the virtual effect command may be regarded as a virtual effect signal for generating a virtual effect emulating the powertrain characteristics of an internal combustion engine vehicle. The virtual effect command, which is the virtual effect signal, is reflected in the final torque command, and the operation of the motor is controlled according to the final torque command to which the virtual effect command is reflected, and thus the virtual effect emulating the powertrain characteristics of an internal combustion engine vehicle, that is, virtual vibration, may be generated by the motor.

Accordingly, in the present disclosure, virtual vibration linked to the tooth surface pressure of the powertrain gear may be generated by the motor driving the vehicle, and the virtual vibration is vibration that mimic the vibration which may occur in existing internal combustion engine vehicles. In the instant case, the motor is a driving device configured for driving the vehicle, but also functions as a virtual effect generation device configured for generating a virtual effect.

The apparatus of virtualizing characteristics of an internal combustion engine vehicle according to an exemplary embodiment of the present disclosure may further include: an interface unit 11 used by a driver to select and input one of On or off of the virtual effect implementation function.

In the present disclosure, a means for a driver to selectively operate On or off in the vehicle and output an electrical signal according to On or off may be used as an interface unit 11. For example, it may be a manipulation device such as a button or a switch provided in a vehicle, or an input device or a touch screen of an AVN (audio, video and navigation) system.

The interface unit 11 may be connected to the first controller 20, and the first controller 20 may also be connected to the virtual effect creation control unit 22, which will be described later. Accordingly, when there is an ON or OFF manipulation of the driver through the interface unit 11, the ON or OFF signal from the interface unit 11 may be input to the virtual effect creation control unit 22 of the first controller 20. The virtual effect creation control unit 22 of the first controller 20 may recognize the ON or OFF manipulation state of the virtual effect implementation function by the driver.

In the present disclosure, the virtual effect implementation function is executed only when the driver inputs ON of the virtual effect implementation function through the interface unit 11. Furthermore, when the interface unit 11 is an input device provided in a vehicle, a mobile device may be used as the interface unit 11, although not shown in FIG. 3, instead of the input device of the vehicle, and the On or off manipulation of the virtual effect implementation function may also be performed by the driver using the mobile device.

The mobile device needs to be configured for being communicatively connected to an in-vehicle device, for example, the first controller 20, and to the present end, an input/output communication interface for communication connection between the mobile device and the first controller 20 is used.

Furthermore, the driver may set virtual effect application conditions such as set values using the interface unit 11, and when the virtual effect application condition is satisfied, the virtual effect implementation function according to an exemplary embodiment of the present disclosure may be performed (see step S1 in FIG. 4).

The apparatus of virtualizing characteristics of an internal combustion engine vehicle according to an exemplary embodiment of the present disclosure may further include: at least one of the vibration device 51 for generating virtual vibrations and the sound device 54 for generating and outputting virtual sounds.

The vibration device 51 and the sound device 54 are also virtual effect generating devices for generating virtual effects. In the present disclosure, one of a motor which is the driving device 41 and the vibration device 51 among the virtual effect generating devices may be used to generate virtual vibrations.

As described above, in the present disclosure, although virtual vibrations may be generated using a motor configured for moving a vehicle, a virtual vibration may be generated using a separate vibration device 51 provided in the vehicle instead of the motor.

The vibration device 51 is provided to generate vibrations according to an electrical signal output from the virtual effect creation control unit 22 of the first controller 20, that is, a virtual effect signal for generating and implementing virtual effects.

The vibration device 51 may include: a vibration amplifier 52 that receives a virtual effect signal and outputs an amplified vibration signal; and a vibration actuator 53 for generating vibrations by the amplified vibration signal output from the vibration amplifier 52.

As the vibration amplifier 52 and the vibration actuator 53, a well-known vibration amplifier and vibration actuator may be used. Additionally, the vibration actuator 53 of the vibration device 51 may be provided at a predetermined position in the vehicle where the driver may detect the vibration generated therefrom.

For example, the vibration actuator 53 of the vibration device 51 may be provided on the vehicle body or the seat, and may be provided at a position where vibration generated while driving may be transmitted to the driver through the vehicle body or the seat.

The sound device 54 is provided to generate a sound according to an electric signal output from the virtual effect creation control unit 22 of the first controller 20, that is, a virtual effect signal for generating and implementing a virtual effect.

The sound device 54 may include: a sound amplifier 55 that receives a virtual effect signal and outputs an amplified sound signal; and a speaker 56 for generating and outputting sound by the amplified sound signal output from the sound amplifier 55.

As the sound amplifier 55 and the speaker 56, well-known sound amplifiers and speakers may be used, and those already provided in the vehicle may be used. The speaker 56 may be a speaker mounted to output sound to the inside or outside of the vehicle.

Hereinafter, a method of generating virtual vibration and sound according to an exemplary embodiment of the present disclosure will be described in detail.

First, the virtual effect creation control unit 22 of the first controller 20 obtains information on tooth surface pressure of the powertrain gear (hereinafter abbreviated as "gear tooth surface pressure"), and the magnitude of the virtual effect, that is, the amplitude of the virtual vibration and the volume of the virtual sound (which is the amplitude in the waveform of the virtual sound signal) may be determined to be proportional to the size of the obtained gear tooth surface pressure (step S2 in FIG. 4).

When the magnitude of the virtual effect, that is, the amplitude of the virtual vibration and the volume of the virtual sound, is obtained as described above, the waveform of the virtual effect signal may be determined in real time (step S3 in FIG. 4). Furthermore, the determined virtual effect signal (or virtual effect command) may be transmitted to generate a virtual effect in the vibration device 51 (or motor) and the sound device 54 (see steps S4 and S5 of FIG. 4).

Figure 5:
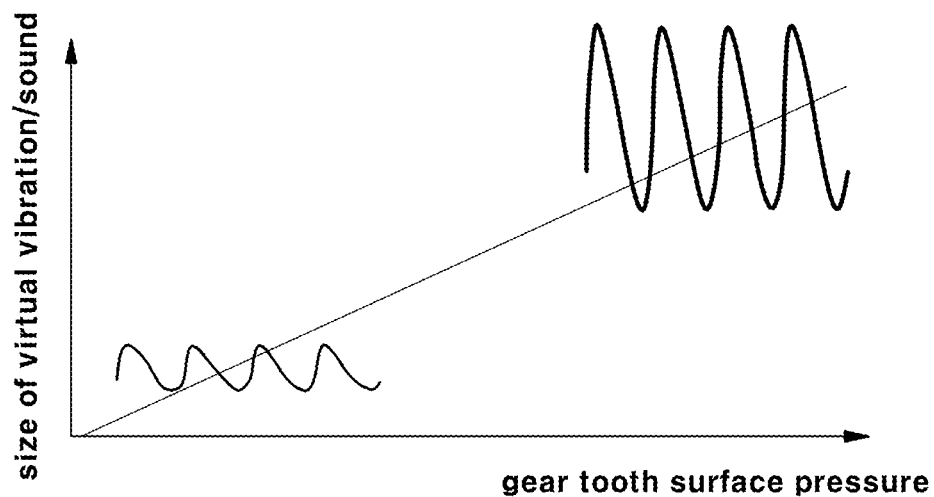
FIG. 5 is a diagram schematically showing waveforms and sizes of a virtual vibration signal and a virtual sound signal according to a gear tooth surface pressure in the present disclosure.

FIG. 5 is a diagram schematically showing waveforms and sizes of a virtual vibration signal and a virtual sound signal according to a gear tooth surface pressure in the present disclosure. The magnitude of the illustrated waveform is the amplitude of the virtual vibration and the volume of the virtual sound (which is the amplitude of the waveform).

In general, it is natural that the transmission of actual vibration becomes easier when the size of the gear tooth surface pressure increases. To emulate this, as the absolute value of the tooth surface pressure of the gear in the powertrain apparatus, that is, as the gear tooth surface pressure increases, it is possible to increase the amplitude of the vibration or the volume of the sound (the amplitude of the waveform) in proportion to the absolute value of the gear tooth surface pressure (see FIGS. 9 and 11 to be described later).

In addition to increasing proportionally as described above, it is also effective to make the gear tooth surface pressure and the increase/decrease direction of the virtual effect (virtual vibration and virtual sound) coincide with each other. That is, as the gear tooth surface pressure increases, the size of the virtual effect also increases, or as the gear tooth surface pressure decreases, the size of the virtual effect also decreases.

In other words, the amplitude of the virtual effect may have a function of monotonically increasing or monotonically decreasing with respect to the gear tooth surface pressure.

Moreover, when the gear tooth surface pressure is the pressure set as belonging to the backlash region, the amplitude of the virtual vibration and the volume of the virtual sound may be set to the minimum. At the instant time, zero (0) may be set as the pressure in the backlash region. That is, the area where the gear tooth surface pressure is zero (0) may be referred to as the backlash region.

Figure 6:
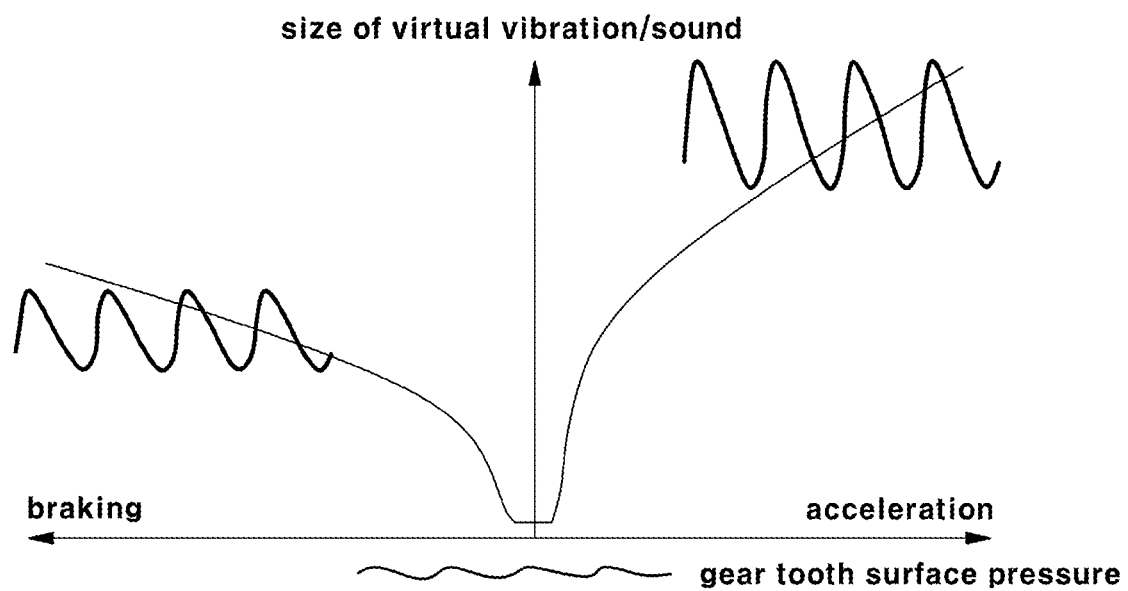
FIG. 6 is a diagram showing waveforms and sizes of the virtual vibration signal and the virtual sound signal when the gear tooth surface pressure is zero (0) in the present disclosure.

FIG. 6 is a diagram showing waveforms and sizes of virtual vibration signals and virtual sound signals when the gear tooth surface pressure is zero (0) in the present disclosure. The magnitude of the illustrated waveform is the amplitude of the virtual vibration and the volume of the virtual sound (which is the amplitude of the waveform).

When gear backlash actually occurs in the powertrain apparatus, it may be considered that the physical coupling between the gears is stopped. In the instant case, the actual vibration will not be transmitted to the powertrain apparatus, but will be transmitted to the surrounding lubricant, machine parts shaft, housing, etc., and will have damping characteristics. Thus, as a strategy for generating a virtual effect that realistically emulates such an effect, it is preferable to set the size of the virtual effect (virtual vibration and virtual sound) to be the set minimum value.

Accordingly, in the present disclosure, the virtual effect creation control unit 22 of the first controller 20 may determine the size of the virtual effect (the amplitude of the virtual effect signal) as a preset minimum value when the gear tooth surface pressure corresponds to the pressure in the preset backlash region.

Furthermore, because it is difficult to directly measure the gear tooth surface pressure, a method of substituting information proportional to the gear tooth surface pressure may be applied.

Gear tooth surface pressure is proportional to transmitted torque. Based on the present assumption, the virtual effect creation control unit 22 of the first controller 20 may estimate the gear tooth surface pressure using the torque information, and set virtual vibration and virtual volume based on the estimated gear tooth surface pressure.

To be specific, the gear tooth surface pressure for setting the magnitude of the vibration effect (the amplitude of the vibration and the volume of the sound) may be determined from one of the following information.

1. Motor torque command as input torque command (basic torque command)
2. Estimate of input torque (motor torque)
3. Input torque detection value detected by sensor
4. Filter applied value to input torque
5. Transmission torque value based on the output powertrain model using the input torque as an input value (in the present disclosure, this is defined as "output torque")

The input torque means a torque of a main torque source that generates a torque for driving the vehicle and applies it to the powertrain apparatus, and in the instant case, a command value may be used as the input torque. Because the main torque source is the driving device 41 for driving the vehicle, and the driving device, which is the main torque source in the electric vehicle, is a motor, the command may be a motor torque command (final torque command) as an input torque command.

To estimate the gear tooth surface pressure, the virtual effect creation control unit 22 of the first controller 20 may determine the gear tooth surface pressure by use of one of motor torque command for controlling the operation of the motor, an estimate of the motor torque output by the motor, motor torque detection value detected by the sensor, the value applied with a filter to the motor torque command, a value obtained by applying a filter to the motor torque estimate value, and a value obtained by applying a filter to the motor torque detection value.

Furthermore, the powertrain model including a gear model may also be used to estimate the gear tooth surface pressure. The powertrain model generally takes into account the stiffness or damping that exists in the gear mesh, as in the example shown in FIGS. 7 and 8, and the backlash that exists between mated gear teeth. Here, the powertrain model may be used as a driveshaft torsion model.

Based on the present powertrain model, it is possible to estimate the torque transmitted between gears using information such as input torque command (motor torque command), the rotation speed of an input portion, and the rotation speed of an output portion. At the instant time, because the transmitted torque is directly proportional to the pushing force between the gear teeth, the gear tooth surface pressure may be determined using the estimated value of the transmitted torque.

Figure 7:
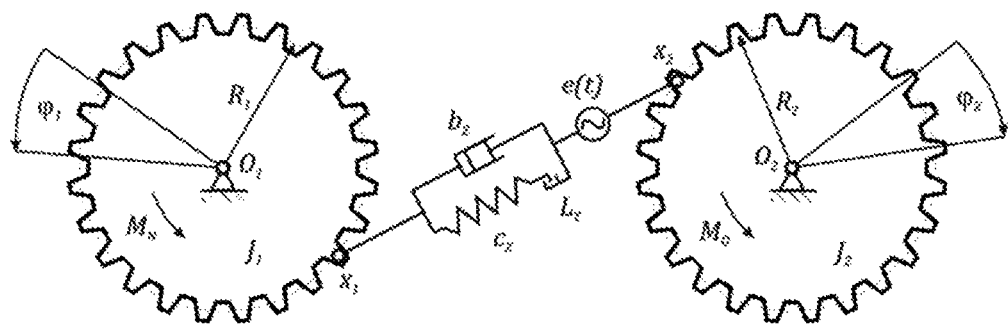
FIG. 7 is a view showing an example of a powertrain gear model.

FIG. 7 is a view showing an example of a powertrain gear model [Prajapat, Ganesh P., N. Senroy, and I. N. Kar. "Modeling and impact of gear train backlash on performance of DFIG wind turbine system." Electric Power Systems Research 163 (2018): 356-364.].

Figure 8:
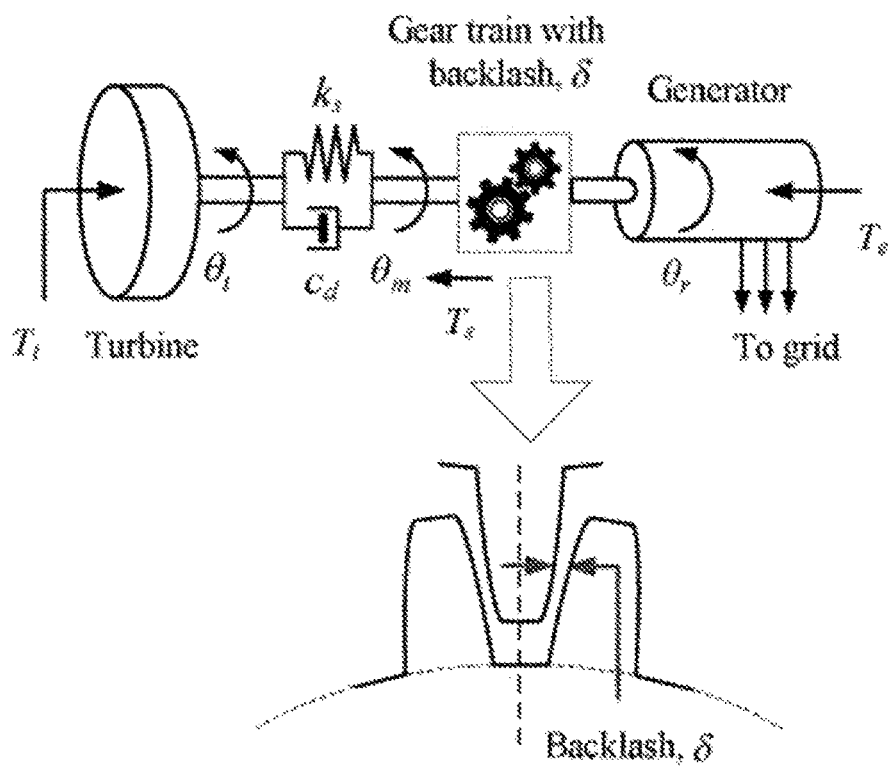
FIG. 8 is a view showing an example of a driveshaft torsion model.

FIG. 8 is a view showing an example of a driveshaft torsion model [Margielewicz, Jerzy, Damian Gaska, and Grzegorz Litak. "Modelling of the gear backlash." Nonlinear Dynamics 97.1 (2019): 355-368.].

When the output torque is determined based on the above-described powertrain model, and the gear tooth surface pressure is determined and estimated as a value proportional to the output torque, the magnitude of the virtual effect, that is, the amplitude of the virtual vibration and the volume of the virtual sound, may be set using the determined gear tooth surface pressure.

At the present time, because the gear tooth surface pressure is related to the output torque determined based on the shaft stiffness model, etc., the magnitude of the virtual effect may be obtained as a value in which the magnitude of the virtual effect changes in real time in association with the determined result value.

Furthermore, the magnitude of the virtual effect, that is, the amplitude of the virtual vibration and the volume of the virtual sound, may be obtained from a map with the gear tooth surface pressure as input. Alternatively, after obtaining a value proportional to the absolute value of the gear tooth surface pressure by scaling the size (absolute value) of the information on the gear tooth surface pressure, set minimum value, that is, minimum amplitude or minimum volume value may be added to the obtained value.

Figure 9:
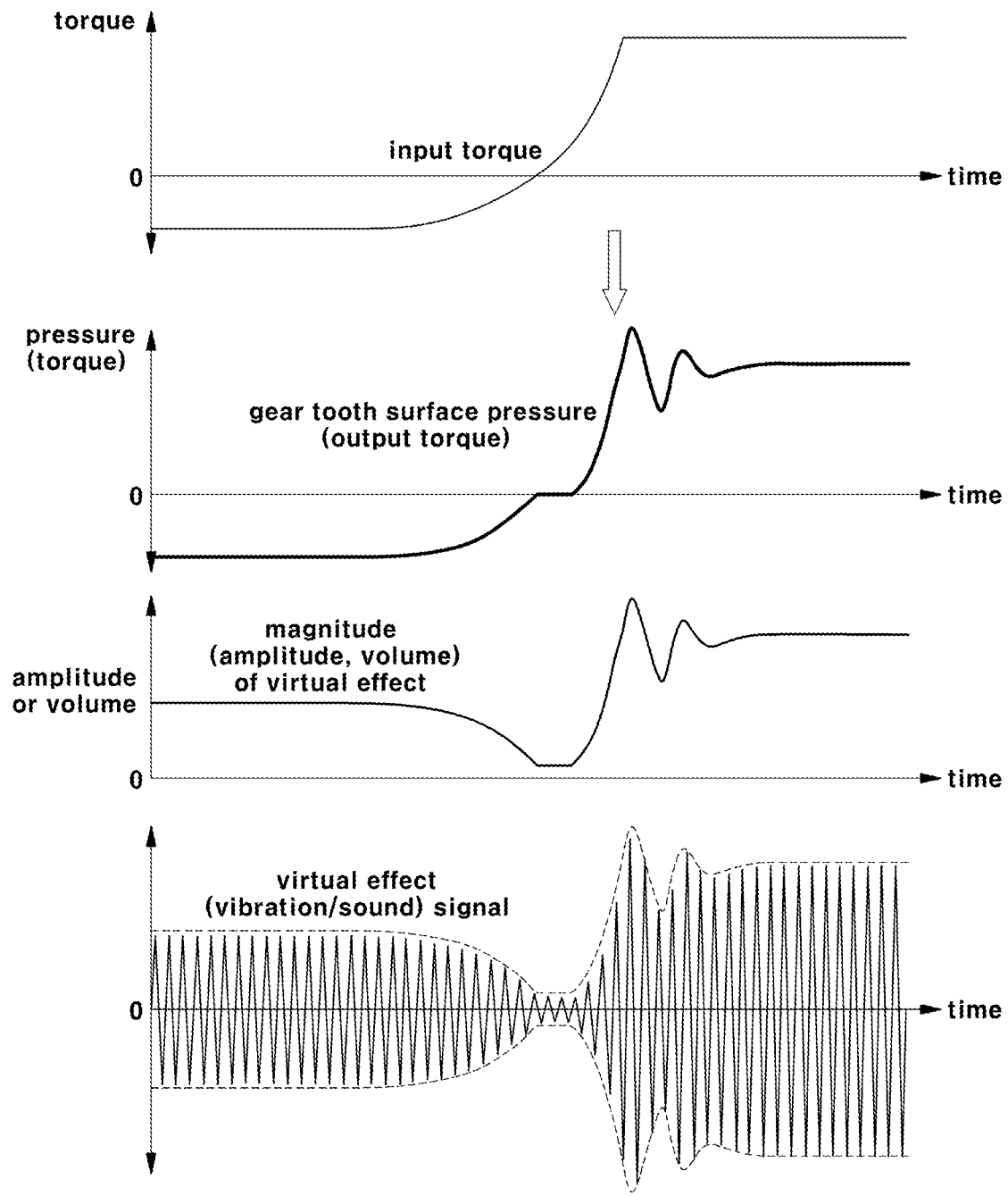
FIG. 9 is a diagram showing an example in which a virtual vibration and a virtual sound are changed in real time in the present disclosure.

FIG. 9 shows that the virtual effect, that is, virtual vibration and virtual sound, changes in real time in the same way as described above. As shown in FIG. 9, the virtual effect creation control unit 22 of the first controller 20 may determine the output torque from the input torque by use of a preset powertrain model, and determine the gear tooth surface pressure as a value proportional to the determined output torque.

In the present disclosure, the input torque may be a motor torque, and the motor torque may be a motor torque command. Additionally, in the case of using the motor as the driving device 41 as the virtual effect generation device, the motor torque used to determine the gear tooth surface pressure may be a basic torque command of the current control cycle or a final torque command of the previous control cycle.

In the case where virtual vibration and virtual sound are generated as virtual effects by use of the vibration device 51 and the sound device 54, the input torque may be the final torque command of the current control cycle.

Because the basic torque command is not corrected in the case of using the vibration device 51 and the sound device 54, the final torque command of the current control cycle may be a basic torque command (command corresponding to the driver demand torque).

Furthermore, the amplitude of the virtual vibration and the volume (amplitude of the waveform) of the virtual sound may be determined from the determined gear tooth surface pressure by a map or the like, and then a virtual effect signal may be generated with the waveform of the determined amplitude.

After all, the vibration of the virtual effect may be generated in the vibration device 51 by the virtual effect signal, and similarly, the sound of the virtual effect may be generated and output in the sound device 54 by the virtual effect signal.

In the present disclosure, when using a motor which is a driving device 41 for driving a vehicle instead of the vibration device 51 to generate virtual vibration, the virtual effect creation control unit 22 of the first controller 20 generates a virtual effect command (virtual effect signal) indicating the waveform of the determined amplitude, and the final torque command generation unit 23 of the first controller 20 generates the final torque command by correcting the basic torque command of the basic torque command generation unit 21 using the virtual effect command.

For example, when the basic torque command generation unit 21 of the first controller 20 generates a basic torque command based on real-time vehicle driving information and the virtual effect creation control unit 22 generates a virtual effect command, the final torque command generation unit 23 may generate the final torque command by adding the basic torque command input from the basic torque command generation unit 21 and the virtual effect command input from the virtual effect creation control unit 22.

When the second controller 30 is configured to control the operation of the motor, which is the driving device 41 of the vehicle, according to the final torque command generated in the present way, vibration emulating vibration of an internal combustion engine vehicle (virtual vibration) may be generated and provided by the motor.

Meanwhile, in an exemplary embodiment of the present disclosure, it is possible to binarize the waveform of the virtual effect. That is, the shape and position of the tooth surfaces may vary depending on the shape profile design of the actual gear, and the vibration profile may change depending on the shape and position of these tooth surfaces or the magnitude and direction of the transmitted torque. Thus, to emulate the present effect, the change in the vibration profile may also be reflected in the virtual vibration and virtual sound profiles.

First, the type of profile in the virtual vibration signal and virtual sound signal waveform may be changed depending on the amount of torque transmitted by the powertrain gear. For example, it may be made to gradually change from profile 1 to profile 2 as the magnitude of the torque increases.

Alternatively, the type and amplitude of the profile of the virtual vibration signal and the virtual sound signal waveform may be binarized depending on the direction of the torque. For example, profile 1 may be used when a forward torque is applied, and profile 2 may be used when a reverse torque is applied.

At the present time, if profile 1 is defined as a vibration profile when a forward torque is applied and profile 2 is defined as a vibration profile when a reverse torque is applied, the frequency component of profile 1 may be the to be more heterogeneous than the frequency component of profile 2. That is, the frequency component of profile 2 is more homogeneous than the frequency component of profile 1.

In the waveforms of the virtual vibration signal and the virtual sound signal, the reason for setting the different profiles of the waveforms when the forward torque is applied and when the reverse torque is applied as described above is because, when analyzing the vibration characteristics of the powertrain apparatus to which the internal combustion engine, which is the actual emulation target, is applied, there is an explosion stroke of the engine while generating forward torque, and in the case of forward torque generation (fired) that goes through the process of suction-compression-explosion-exhaust compared to the case of reverse torque generation (motored) that simply goes through the process of suction-compression-expansion-exhaust, the vibration component due to the explosion is added, and the frequency component is mixed.

Moreover, a peak shape among the waveforms of the profile 1 may be a sharper shape than a peak shape among the waveforms of the profile 2. That is, the heterogeneous frequency component of profile 1 is higher than the primary frequency band of profile 2.

Figure 10:
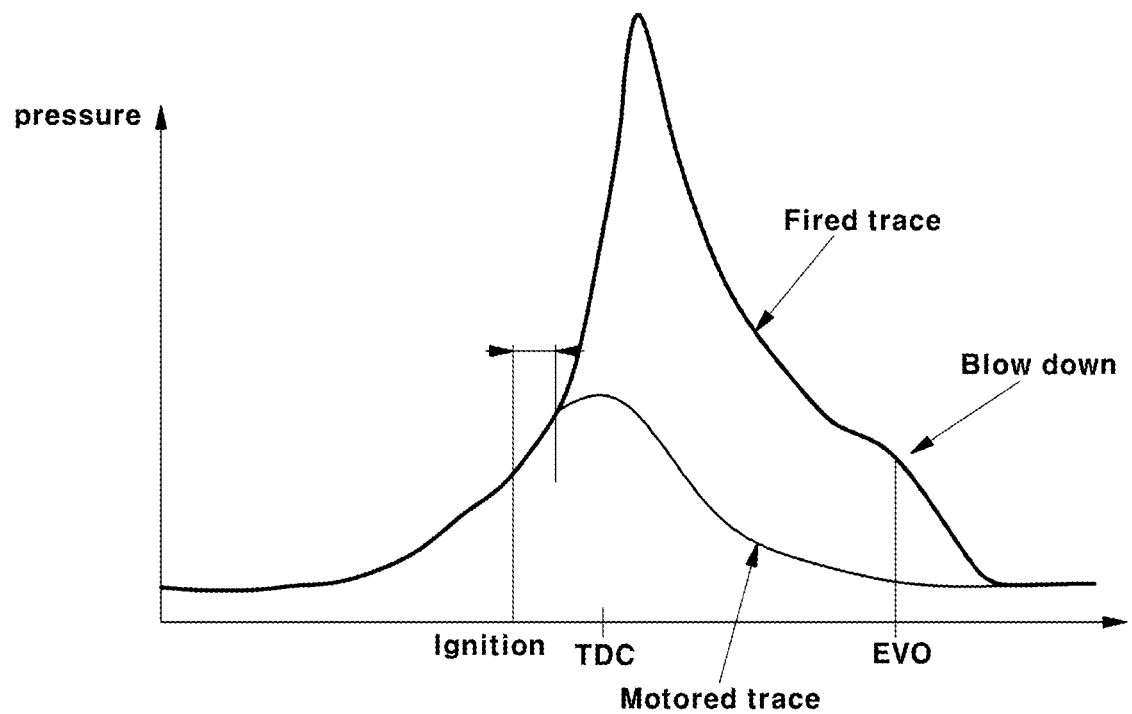
FIG. 10 is a diagram showing a cylinder pressure state of an internal combustion engine.

The reason for differentiating in the peak shape of the waveform when applying the forward torque and when applying the reverse torque as described above is to emulate an effect of the explosion. Referring to FIG. 10, it may be seen that a high-frequency component is added in the "fired trace" (forward torque generation) compared to the "motored trace" (reverse torque generation) in the cylinder pressure state of a typical gasoline engine.

Figure 11:
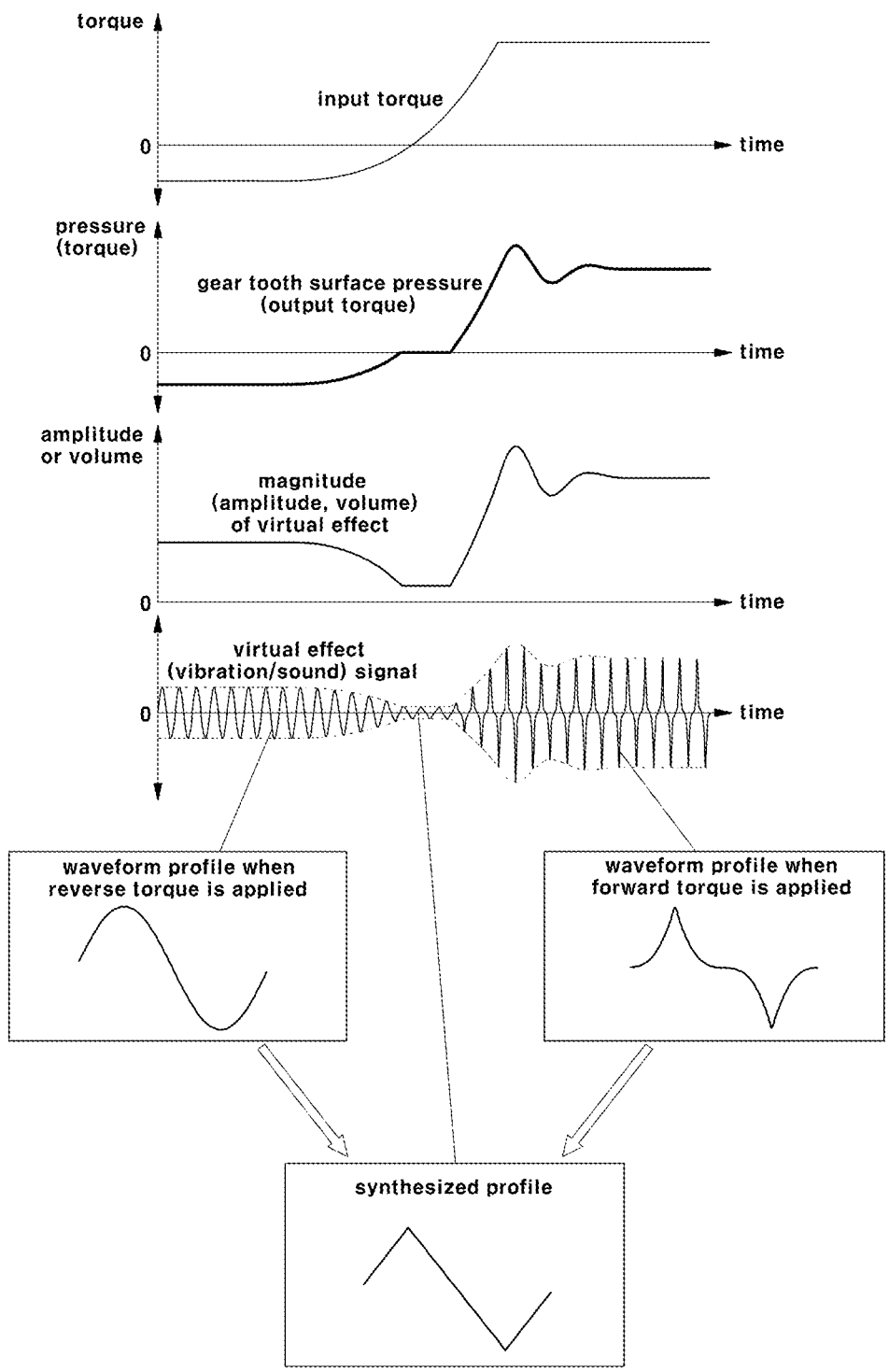
FIG. 11 is a diagram showing an example of changing the size and shape in real time in the waveform of virtual effects after the gear tooth surface pressure is determined in the present disclosure.

FIG. 11 is a view showing an example of changing the size and shape in real time in the waveform of virtual effects after the gear tooth surface pressure is determined in the present disclosure. In the present disclosure, the virtual effect includes virtual vibration and virtual volume as described above. Additionally, the size of the waveform corresponds to the amplitude of the vibration and the volume of the sound.

Referring to FIG. 11, it may be seen that the vibration profile is set separately when reverse torque is applied and when forward torque is applied. As shown, the profile of the waveform when the reverse torque is applied and the profile of the waveform when the forward torque is applied may be preset with different peak shapes.

In the example of FIG. 11, the input torque is converted from the reverse torque, which is a negative (−) torque, to the forward torque, which is a positive (+) torque, and at the instant time, the gear tooth surface pressure also converts from negative torque and pressure to positive torque and pressure. The negative (−) torque is a torque that decelerates the vehicle, and the positive (+) torque is a torque that accelerates the vehicle.

As shown in FIG. 11, after the gear tooth surface pressure is determined, the magnitude of the virtual effect, that is, the amplitude of the virtual vibration and the volume of the virtual sound, may be obtained based on the determined gear tooth surface pressure. At the instant time, the amplitude of the virtual vibration and the volume of the virtual sound that change in real time in association with the gear tooth surface pressure may be obtained.

When the amplitude of the virtual vibration and the volume of the virtual sound linked to the real-time gear tooth surface pressure are obtained as described above, the set profile of the waveform when the forward torque is applied and the set profile of the waveform when the reverse torque is applied are applied, and yet, a virtual vibration signal of a waveform whose amplitude changes in real time and a virtual sound signal of a waveform whose volume changes in real time may be determined.

To sum up, when the virtual effect creation control unit 22 of the first controller 20 generates and outputs a virtual vibration signal and a virtual sound signal according to the above method, the vibration device 51 and the sound device 54 may generate and output the vibration and sound according to the virtual vibration signal and the virtual sound signal as described above.

In the example of FIG. 11, in the backlash section in which the gear tooth surface pressure becomes zero (0), a profile obtained by combining the profile at the time of applying the forward torque and the profile at the time of applying the reverse torque may be used. At the instant time, the two profiles may be synthesized using a method of multiplying the waveform values of the two profiles by weights ($\alpha$, 1-$\alpha$) and then summing the two values each multiplied by weights.

The weight $\alpha$ may be determined by a map with input torque or output torque as an input. That is, from the input torque or the output torque, the corresponding weight a may be determined by the map, and when the weight $\alpha$ is determined, one profile may be obtained by applying and synthesizing $\alpha$ and 1-$\alpha$ to two types of profiles.

Referring to FIG. 11, one profile synthesized (synthesized in a ratio of 5:5) by applying a weight $\alpha$=0.5 to each of the profile of the waveform when the reverse torque is applied and the profile of the waveform when the forward torque is applied is exemplified.

Thus far, a method of virtualizing characteristics of an internal combustion engine vehicle in an electric vehicle according to an exemplary embodiment of the present disclosure has been described in detail.

According to the method of virtualizing characteristics of an internal combustion engine vehicle of the present disclosure, it is possible to generate and provide virtual vibrations and virtual sounds that are linked to the tooth surface pressure of the powertrain gear. Accordingly, the characteristics of the virtual internal combustion engine powertrain apparatus may be generated and realized in an electric vehicle with vibration and sound, and the realism of the virtual effect may be maximized.

Furthermore, it is possible to provide a driver with a more realistic feeling of operation and driving similar to that of the internal combustion engine powertrain apparatus, and to greatly improve the vehicle's marketability by providing highly realistic virtual effects. Furthermore, the driver can experience the driving sensibility, fun, excitement, and direct shift feeling provided by the internal combustion engine powertrain apparatus in his or her vehicle without having to switch to an internal combustion engine vehicle.

Furthermore, the term related to a control device such as "controller", "control apparatus", "control unit", "control device", "control module", or "server", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of virtualizing characteristics of an internal combustion engine vehicle in an electric vehicle, the method comprising:
   determining, by a controller, a current input torque applied to a powertrain apparatus from a motor of the electric vehicle that makes the electric vehicle move;
   determining, by the controller, an output torque which is a transmission torque based on a powertrain model from the determined current input torque using the powertrain model set to include a gear model;
   determining, by the controller, tooth surface pressures of gears in the powertrain apparatus between the motor and driving wheels of the electric vehicle from the determined output torque;
   generating, by the controller, a virtual effect signal for generating a virtual effect that simulates powertrain characteristics of the internal combustion engine vehicle based on the determined tooth surface pressures of the gears in the powertrain apparatus; and
   generating, by the controller, a virtual effect that simulates powertrain characteristics of the internal combustion engine vehicle by controlling an operation of a virtual effect generation device that generates a virtual effect according to the generated virtual effect signal.

2. The method of claim 1, wherein the input torque is one of a motor torque command for controlling an operation of the motor, a motor torque estimate estimated by the controller, a motor torque detection value detected by a sensor, a filter applied value to the motor torque command, a filter applied value to the motor torque estimate, and a value obtained by applying a filter to the motor torque detection value.

3. The method of claim 1, wherein in the determining tooth surface pressures of the gears in the powertrain apparatus, the tooth surface pressures of the gears in the powertrain apparatus are determined as a value proportional to the output torque.

4. The method of claim 1, wherein the virtual effect includes at least one of a virtual vibration simulating vibrations generated by the powertrain apparatus in the internal combustion engine vehicle, and a virtual sound simulating sounds generated by the powertrain apparatus in the internal combustion engine vehicle.

5. The method of claim 1, wherein in the generating of the virtual effect signal, the controller is configured to determine a magnitude of the virtual effect linked to the tooth surface pressures of the gears in the powertrain apparatus, and to generate a virtual effect signal of a waveform whose amplitude is the magnitude of the virtual effect.

6. The method of claim 5, wherein the controller is configured to determine the magnitude of the virtual effect as a larger value as size of the tooth surface pressures of the gears in the powertrain apparatus increases.

7. The method of claim 5, wherein the controller is configured to determine the magnitude of the virtual effect as a preset minimum value when the tooth surface pressures of the gears in the powertrain apparatus correspond to pressures of a preset backlash section.

8. The method of claim 5, wherein the controller is configured to determine the magnitude of the virtual effect by use of a map from the tooth surface pressures of the gears in the powertrain apparatus.

9. The method of claim 5, wherein the controller is configured to obtain a value proportional to a size of the tooth surface pressures by scaling the size of the tooth surface pressures of the gears in the powertrain apparatus, and to determine the magnitude of the virtual effect by adding a set minimum value to the obtained value.

10. The method of claim 5, wherein a waveform profile of the virtual effect signal is set differently according in a direction of a torque transmitted by the gears in the powertrain apparatus.

11. The method of claim 10, wherein when the torque transmitted by the gears in the powertrain apparatus is a forward torque that accelerates the electric vehicle, a peak shape of the waveform is set to a relatively sharper shape compared to a case of a reverse torque decelerating the electric vehicle.

12. The method of claim 10, wherein the controller is configured to generate the virtual effect signal as a waveform of a profile obtained by synthesizing a profile in a forward direction and a profile in a reverse direction in the direction of the torque when the tooth surface pressures of the gears in the powertrain apparatus correspond to pressures in a preset backlash section.

13. The method of claim 1, further including:
obtaining, by the controller, real-time vehicle driving information; and
generating a basic torque command from the obtained real-time vehicle driving information,
wherein the controller is configured to generate a virtual effect command for generating the virtual effect in the generating of the virtual effect signal, to generate a final torque command from the generated virtual effect command and the generated basic torque command in the generating of the virtual effect, and to control an operation of the motor as a virtual effect generation device according to the final torque command.

14. The method of claim 1, wherein the virtual effect generation device is a vibration device that generates a vibration of an amplitude according to a waveform of the virtual effect signal in the electric vehicle.

15. The method of claim 1, wherein the virtual effect generation device is a sound device that generates and outputs a sound of a volume according to a waveform of the virtual effect signal in the electric vehicle.

16. An apparatus of virtualizing characteristics of an internal combustion engine vehicle in an electric vehicle, the apparatus comprising:
a driving information detection unit provided in the electric vehicle and configured for detecting vehicle driving information;
a virtual effect generation device; and
a controller connected to the driving information detection unit and the virtual effect generation device and configured to:
determining a current input torque applied to a powertrain apparatus from a motor of the electric vehicle that makes the electric vehicle move;
determining an output torque which is a transmission torque based on a powertrain model from the determined current input torque using the powertrain model set to include a gear model;
determining tooth surface pressures of gears in the powertrain apparatus between the motor and driving wheels of the electric vehicle from the determined output torque;
generating a virtual effect signal for generating a virtual effect that simulates powertrain characteristics of the internal combustion engine vehicle based on the determined tooth surface pressures of the gears in the powertrain apparatus; and
generating a virtual effect that simulates powertrain characteristics of the internal combustion engine vehicle by controlling an operation of the virtual effect generation device that generates a virtual effect according to the generated virtual effect signal; and
a non-transitory storage medium configured for storing an algorithm for an operation of the controller.

17. The apparatus of claim 16, wherein the input torque is one of a motor torque command for controlling an operation of the motor, a motor torque estimate estimated by the controller, a motor torque detection value detected by the driving information detection unit, a filter applied value to the motor torque command, a filter applied value to the motor torque estimate, and a value obtained by applying a filter to the motor torque detection value.

18. The apparatus of claim 16, wherein in the determining tooth surface pressures of the gears in the powertrain apparatus, the tooth surface pressures of the gears in the powertrain apparatus are determined as a value proportional to the output torque.

19. The apparatus of claim 16, wherein the virtual effect includes at least one of a virtual vibration simulating vibrations generated by the powertrain apparatus in the internal combustion engine vehicle, and a virtual sound simulating sounds generated by the powertrain apparatus in the internal combustion engine vehicle.

20. The apparatus of claim 16, wherein in the generating of the virtual effect signal, the controller is configured to determine a magnitude of the virtual effect linked to the tooth surface pressures of the gears in the powertrain apparatus, and to generate a virtual effect signal of a waveform whose amplitude is the magnitude of the virtual effect.

* * * * *